United States Patent [19]

Ono et al.

[11] Patent Number: 4,873,435

[45] Date of Patent: Oct. 10, 1989

[54] LASER BEAM SCANNING SYSTEM

[75] Inventors: Shuji Ono; Masafumi Yamamoto, both of Kanagawa, Japan

[73] Assignee: Fuji Photo Film Co., Ltd., Kanagawa, Japan

[21] Appl. No.: 148,831

[22] Filed: Jan. 27, 1988

[30] Foreign Application Priority Data

Jan. 27, 1987 [JP] Japan .................................. 62-17044

[51] Int. Cl.⁴ ............................................. H04N 1/04
[52] U.S. Cl. ..................................... 250/235; 250/201; 350/6.91; 358/494
[58] Field of Search ........... 250/234, 235, 236, 201 R; 350/6.5–6.91; 358/206, 208, 293

[56] References Cited

U.S. PATENT DOCUMENTS

| | | | |
|---|---|---|---|
| 4,143,403 | 3/1979 | Ohnishi | 358/208 |
| 4,314,154 | 2/1982 | Minoura et al. | 250/235 |
| 4,404,596 | 9/1983 | Juergensen et al. | 358/293 |
| 4,441,126 | 4/1984 | Greenig et al. | 358/206 |

Primary Examiner—Edward P. Westin
Attorney, Agent, or Firm—Sughrue, Mion, Zinn, Macpeak & Seas

[57] ABSTRACT

A laser beam emitted from a laser source is deflected by a light deflector such as a rotational polygonal mirror or a galvanometer mirror to scan a surface-to-be-scanned. A beam position detector detects the incident position of the laser beam on the light deflector, and a control circuit drives an optical path changing mechanism according to the output of the beam position detector to change the optical path of the laser beam upstream of the light deflector so that the laser beam impinges upon the light deflector at the regular position.

2 Claims, 2 Drawing Sheets

LASER BEAM SCANNING SYSTEM

BACKGROUND OF THE INVENTION

1. Field of the Invention

This invention relates to a laser beam scanning system for deflecting a laser beam to scan a surface-to-be-scanned, and more particularly to such a laser beam scanning system which is less affected by wandering of the laser source.

2. Description of the Prior Art

Recently, there have been developed various laser beam scanning systems for reading and/or recording of an image by the use of a laser beam. In such systems, a laser beam emitted from a laser source is deflected by a light deflector such as a rotational polygonal mirror or a galvanometer mirror to scan a surface-to-be-scanned which is conveyed at a constant speed in a sub-scanning direction, i.e., a direction perpendicular to the deflecting direction.

The beam emanating position and the beam emanating direction can vary from laser source to laser source, and at the same time, the beam emanating position and the beam emanating direction of a laser source can be changed when environmental conditions such as startup time, temperature, environmental stress and the like change. The latter phenomenon is generally referred to as "laser beam wandering", and when laser beam wandering occurs, the optical path of the laser beam fluctuates and the scanning accuracy is lowered. Particularly significant is the fact that fluctuation in the beam emanating position is enlarged by the beam expander which is generally provided between the laser source and the light deflector and a part of the laser beam can be prevented from impinging upon the deflecting surface of the light deflector. Further, when wobbling of the light deflector shaft occurs in the light deflector for deflecting the laser beam, scanning lines on the surface-to-be-scanned can be distorted in the sub-scanning direction. In order to avoid this, there has been proposed a scanning system in which an anamorphic optical system is provided between the light deflector and the surface-to-be-scanned. However, in such a scanning system, the problem of laser beam wandering is particularly serious. That is, in the scanning system, an incident optical system such as a cylindrical lens is disposed between the laser source and the light deflector to cause the laser beam to impinge upon the deflecting surface of the light deflector as a line image extending perpendicular to the driving shaft of the light deflector, and an anamorphic optical system such as a cylindrical lens is provided between the light deflector and the surface-to-be-scanned to make the deflecting surface of the light deflector and the surface-to-be-scanned conjugate to each other and to cause the laser beam in the form of the line image to focus on the surface-to-be-scanned as a point image, thereby causing the laser beam to fixedly focus on the surface-to-be-scanned in the regular position irrespective of wobbling of the light deflector shaft. In the scanning system, the cylindrical lens between the light deflector and the surface-to-be-scanned makes it difficult to cause the laser beam to precisely focus on the surface-to-be-scanned, and curvature of field, i.e., arcing of the locus of the focusing point, is apt to occur, whereby the laser beam can blur at the ends of the scanning range. Accordingly, if the beam emanating position and the beam emanating direction fluctuate in the main scanning direction, the optical path of the laser beam after deflection can deviate to increase the curvature of field and at the same time, the accuracy of shaft wobbling correction can be lowered.

Though the problems described above can be overcome, for instance, by a careful selection of the laser source or by strictly controlling the temperature near the laser mount, these approaches will substantially add to the cost.

SUMMARY OF THE INVENTION

In view of the foregoing observations and description, the primary object of the present invention is to provide a laser beam scanning system in which the problems that a part of the laser beam can be prevented from impinging upon the deflector and the curvature of field can be increased because of fluctuation in the beam emanating position and the beam emanating direction of the laser source can be overcome without substantially adding to the cost.

Since it can be considered that the above problems are due to fluctuation in the incident position of the laser beam on the light deflector in which the laser beam impinges upon the light deflector, the above problems can be avoided by fixing the incident position of the laser beam on the light deflector.

Accordingly, the laser beam scanning system in accordance with the present invention is characterized by having a beam position detecting means which detects the incident position of the laser beam on the light deflector, an optical path changing means which changes the optical path of the laser beam upstream of the light deflector, and a control circuit which drives the optical path changing means according to the output of the beam position detecting means so that the laser beam impinges upon the light deflector at a predetermined position.

DESCRIPTION OF THE PREFERRED EMBODIMENT

Figure 1:
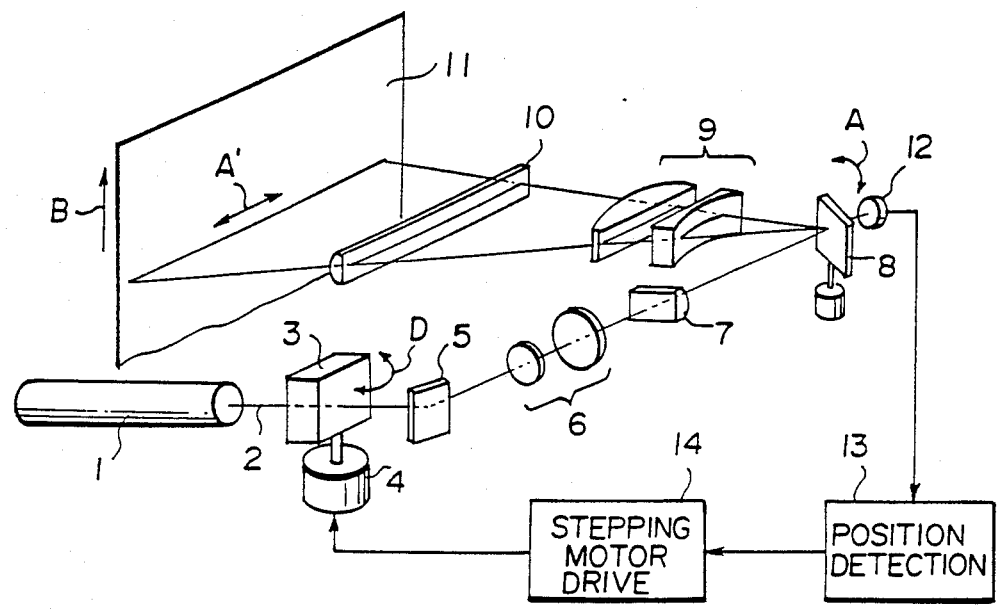
FIG. 1 is a perspective view of a laser beam scanning system in accordance with an embodiment of the present invention.
Figure 2:
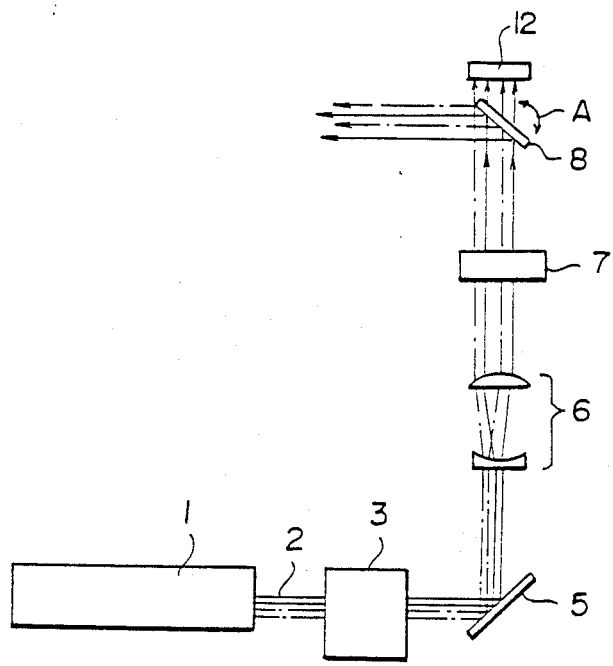
FIG. 2 is a plan view of a part of the scanning system.

In FIGS. 1 and 2, a laser beam 2 emitted from a laser source 1 impinges upon a mirror 5 after passing through a parallel plate 3 (to be described in detail later) and then is reflected by the mirror 5 to impinge upon a beam expander 6 comprising a pair of lenses. The beam expander 6 adjusts the laser beam 2 into a desired diameter. (In FIG. 1, only the optical path of the laser beam 2 is shown and the diameter of the laser beam 2 is not shown.) The laser beam 2 passing through the beam expander 6 travels through a cylindrical lens 7 which causes the laser beam 2 to converge solely in the vertical direction (sub-scanning direction to be described later) and then impinges upon a light deflector, which is a galvanometer mirror 8 in this particular embodiment, as a line image perpendicular to the driving shaft of the galvanometer mirror 8. The galvanometer mirror 8 is rotated back and forth as shown by arrow A in FIG. 1 to deflect the laser beam 2 in a main scanning direction.

The laser beam 2 deflected by the galvanometer mirror 8 travels through Fθ lenses 9 and through a cylindrical lens 10 disposed to extend in the main scanning direction and impinges upon a surface-to-be-scanned 11 which is conveyed in the direction of arrow B (the sub-scanning direction) to scan the surface-to-be-scanned 11 in response to rotation of the galvanometer mirror 8 as shown by arrow A'. The cylindrical lens 10 causes the laser beam 2 to converge solely in the sub-scanning direction on the surface-to-be-scanned 11, and the distance between the fθ lenses 9 and the surface-to-be-scanned 11 is equal to the overall focal length of the fθ lenses 9. In the system of this embodiment, by causing the laser beam 2 to converge solely in the sub-scanning direction on the galvanometer mirror 8, the scanning position with the laser beam 2 can be prevented from deviating in the sub-scanning direction even if wobbling of the shaft of the galvanometer mirror occurs, whereby scanning lines can be formed at regular intervals in the sub-scanning direction.

When it is assumed that wandering of the laser beam 2 occurs due to change in the environmental conditions of the laser source 1, and that the optical path of the laser beam 2 deviates as shown by the chain line in FIG. 2, a part of the laser beam 2 fails to impinge upon the galvanometer mirror 8 and at the same time, the optical path of the laser beam downstream of the galvanometer mirror 8 is displaced in the main-scanning direction to increase the curvature of field. In this embodiment, a beam position detecting means 12 provided behind the galvanometer mirror 8 detects the incident position of the laser beam 2 on the galvanometer mirror 8 and the parallel plate 3 is driven according to the output of the beam position detecting means 12 to correct the incident position. The beam position detecting means 12 may be a position sensitive device (PSD), for example.

That is, the galvanometer mirror 8 is a half-silvered mirror which reflects the major part of the laser beam and transmits a minor part thereof. The beam position detecting means 12 monitors the incident position of the laser beam 2 on the galvanometer mirror 8 by way of the position of the light transmitted by the galvanometer mirror 8. The parallel plate 3 is rotatable as shown by arrow D and is driven by a stepping motor 4 to adjust the optical path of the incident laser beam 2 in a plane defined by the optical path of the laser beam 2. The beam position detecting means 12 outputs a detecting signal on the basis of the detected incident position of the laser beam 2 and delivers it to a position detecting circuit 13. The position detecting circuit 13 delivers a control signal to a stepping motor control circuit 14 according to the detecting signal. The stepping motor driving circuit 14 drives the stepping motor 4 according to the control signal to rotate the parallel plate 3. The adjustment of the parallel plate 3 is continued until the detecting signal from the beam position detecting means 12 comes to indicate that the laser beam 2 impinges upon the galvanometer mirror 8 in the regular position. The optical path of the laser beam 2 can be adjusted in the following manner, for instance.

Figure 3:
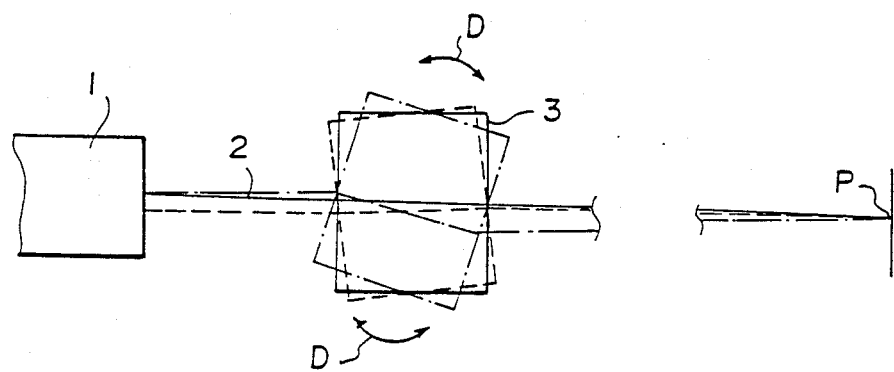
FIG. 3 is a schematic view illustrating the relation between rotation of the parallel plate and the optical path of the laser beam.

In FIG. 3, the solid line shows the regular optical path of the laser beam 2 as viewed in the direction parallel to the driving shaft of the galvanometer mirror 8. When the emanating position of the laser beam 2 deviates to the position shown by the broken line, the parallel plate 3 is rotated to the position shown by the broken line so that the optical path of the laser beam 2 after passing through the parallel plate 3 coincides with the regular optical path. On the other hand, when the emanating direction of the laser beam 2 deviates as shown by the chain line in FIG. 3, the parallel plate 3 is rotated to the position shown by the chain line so that the laser beam 2 impinges upon the galvanometer mirror 8 in the regular position indicated at P. In either case, the optical path of the laser beam 2 can be changed so that the laser beam 2 impinges upon the galvanometer mirror 8 in the regular position by rotating the parallel plate 3, and accordingly, the problem that a part of the laser beam 2 fails to impinge upon the galvanometer mirror 8 or the scanning position is substantially displaced from the regular position to increase the curvature of field can be avoided even if wandering of the laser beam occurs.

The monitoring of the incident position of the laser beam need not be effected in a position behind the galvanometer mirror 8, but may be effected, for instance, by branching a part of the laser beam 2 and providing a beam position detecting means in a position conjugate to the galvanometer mirror on the optical path of the branched part of the laser beam.

Though, in the embodiment described above, a parallel plate is used as the optical path changing means, any other optical means may be employed as the optical path changing means so long as it can change the optical path of the laser beam upstream of the light deflector so that the laser beam impinges upon the regular position. For example, instead of the parallel plate, the mirror 5 may be rotated or may be slid in a plane defined by the optical path of the laser beam. Otherwise, the optical path of the laser beam may be changed by sliding a tapered glass such as a prism inserted into the optical path of the laser beam, or by inserting an acousto-optic modulator (AOM) into the optical path of the laser beam. Further, the optical path of the laser beam can be changed also by moving the beam expander or the laser source mount.

Since the scanning system in accordance with the embodiment described above has an optical system for compensating for wobbling of the light deflector shaft and the laser beam is caused to converge in the sub-scanning direction, wandering of the laser beam in the sub-scanning direction cannot cause a large deviation of the laser beam on the deflecting surface. Accordingly, in the embodiment described above, correction is made only for deviation of the laser beam in the main-scanning direction. However, in the case that the laser beam impinging upon the light deflector has relatively large expansions both in the main-scanning direction and the sub-scanning direction, it is preferred that the beam position detecting means be arranged to two-dimensionally detect the incident position of the laser beam and an optical path changing means for changing the optical path of the laser beam in the main-scanning direction and an optical path changing means for changing the optical path of the laser beam in the sub-scanning direction both be provided to effect correction in both the directions.

We claim:

1. A laser beam scanning system comprising:
   a laser source for emanating a laser beam;
   a light deflector for deflecting the laser beam emanating from the laser source to cause the laser beam to scan a surface-to-be-scanned;
   an optical wobbling correction means including an optical system by which the laser beam impinges on a light reflection surface of said light deflector as a linear image which is perpendicular to a rotational axis of said light detector, and an afocal optical system by which said light reflection surface of said light deflector and the surface-to-be-scanned are placed in an optically conjugate relationship;

a beam position detecting means which detects the incident position of the laser beam on the light deflector;

an optical path changing means which changes the optical path of the laser beam upstream of the light deflector; and a control circuit which drives the optical path changing means according to the output of the beam position detecting means so that the laser beam impinges upon the light deflector at a predetermined position.

2. A laser beam scanning system comprising a laser source for emanating a laser beam, a light deflector for deflecting the laser beam emanating from the laser source to cause the laser beam to scan a surface-to-be-scanned, a beam position detecting means which detects the incident position of the laser beam on the light deflector, an optical path changing means which changes the optical path of the laser beam upstream of the light deflector, and a control circuit which drives the optical path changing means according to the output of the beam position detecting means so that the laser beam impinges upon the light deflector at a predetermined position, wherein said light deflector comprises a galvanometer mirror formed of a half-silvered mirror and said beam position detecting means is disposed on the optical path of the light beam passing through the galvanometer mirror.

* * * * *